March 22, 1932.   R. H. FREDERICK   1,850,749
SEAL FOR PUMPS
Original Filed March 31, 1928
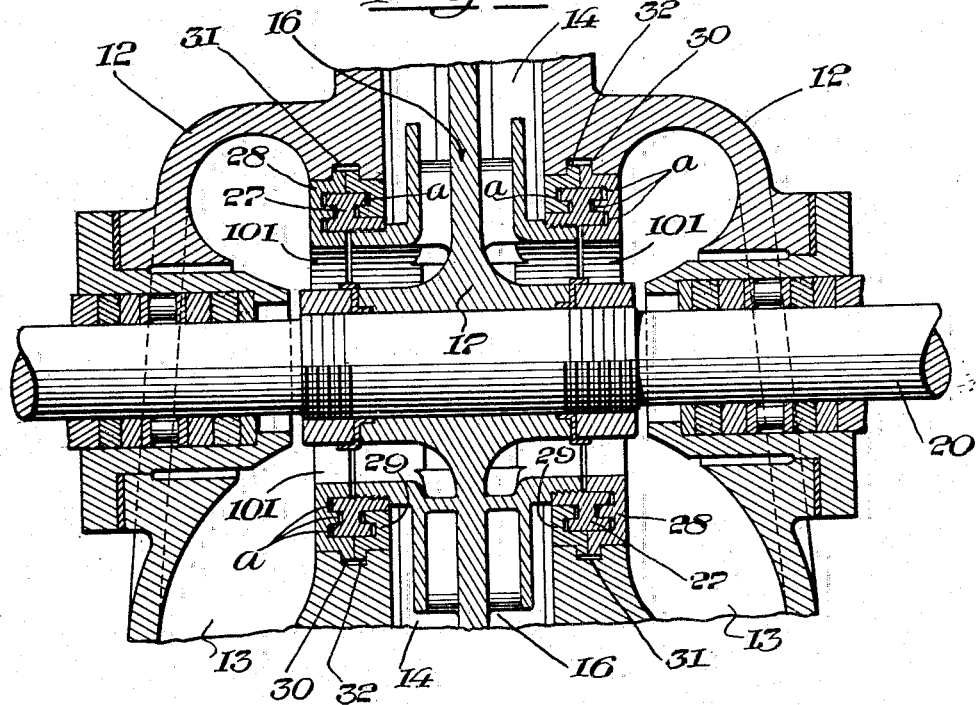
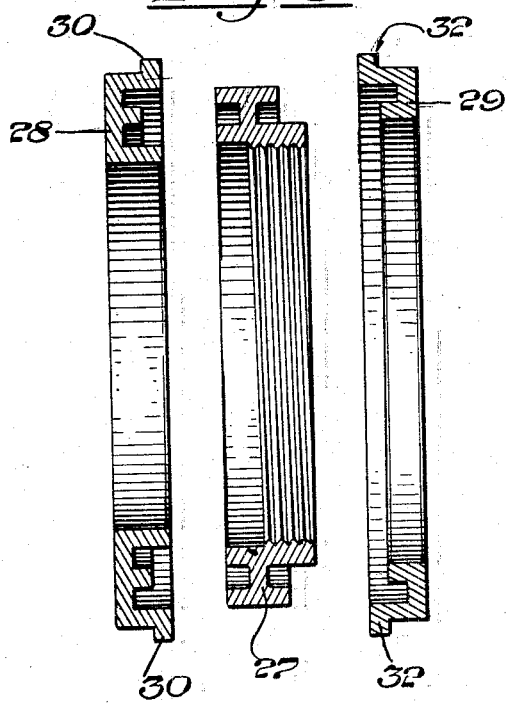
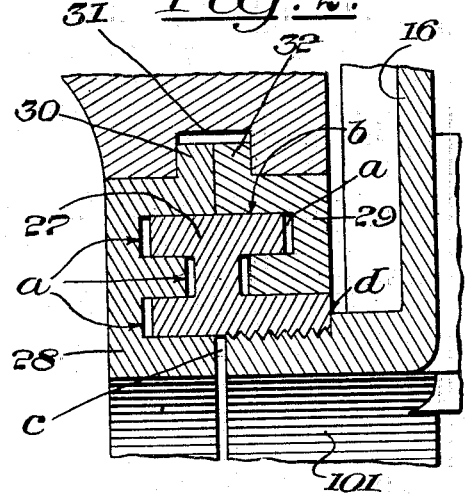
Inventor
Rheuel H. Frederick
by his Attorney
John F. Nolan Patented Mar. 22, 1932

1,850,749

UNITED STATES PATENT OFFICE

RHEUEL H. FREDERICK, OF IRVINGTON, NEW JERSEY, ASSIGNOR TO AMES PUMP COMPANY, INC., OF NEW YORK, N. Y., A CORPORATION OF NEW YORK

SEAL FOR PUMPS

Original application filed March 31, 1928, Serial No. 266,149. Divided and this application filed October 7, 1930. Serial No. 486,892.

The subject of the present application, which is a division of my co-pending case Serial No. 266,149, filed March 31, 1928, (Patent No. 1,805,765, dated May 19, 1931) concerns improvements in labyrinth seals for rotary elements, more particularly the rotor or impeller hub of a centrifugal pump.

As heretofore constructed sealing means of this type embodied intermeshing grooved rings whereof the opposing walls afforded a direct sinuous joint which when the device was used in connection with a centrifugal pump, caused an increase in the velocity of the leakage from the impeller chamber to the suction chamber, thus impairing the inlet capacity and the suction lift of the pump. Moreover the maximum area of the rotating packing ring member was subjected to the higher pressure in the impeller chamber, thus causing undue friction of the contiguous rings.

The object of the invention is to provide simple and efficient sealing means, including a rotating packing ring of novel cross-section and complementary case rings therefor, whereby a relatively small area of the packing ring is subjected to the higher pressure and whereby the velocity of the leakage is decreased in its flow, thus obviating the objections above mentioned.

To this end the invention comprises features of novelty which will be hereinafter described and claimed.

In the drawings—

Figure 1 is a transverse vertical section through a portion of the impeller and suction chambers of a centrifugal pump provided with annular sealing devices embodying my invention.

Fig. 2 is a similar section enlarged through a portion of one of the sealing devices and associated parts.

Fig. 3 represents the separated ring elements of one of the sealing devices.

Referring to the drawings, 12 designates a pump casing having a suction chamber 13 and an impeller chamber 14; 16 designates the rotor or impeller whereof the hub 17 is mounted on a power-driven shaft 20 having its bearings in the side walls of the casing. The hub is provided with inlet eyes 101 affording passages between the suction and impeller chambers.

Packing rings 27 of general H-form in cross-section are screwed or otherwise fastened on the respective ends of the hub 17, and complementary case-rings 28 and 29 are fitted on the respective sides of each of the rings 27 so as to mesh with and form inner and outer peripheral bearing surfaces or portions between the rings 27, and their complementary rings 28 and 29, yet permit the free running of the interposed rings 27.

The case ring 28 at the suction chamber side is of general E-form in cross-section with an outer peripheral flange 30, which ring is fitted to the outer side of the ring 27 so as to register with and embrace the latter, the upper member, including its flange, being tightly seated in the case ring bore of the casing wall, and the wall of this bore being formed with an annular recess 31 to receive the flange. The case ring 29 at the impeller chamber side is of general U-form in cross-section with an outer peripheral flange 32, which ring is fitted to the inner side of the adjacent ring 27, with the upper member including its flange tightly seated in the case ring bore of the casing in close contact with the complementary case ring 28.

By the foregoing described formation and arrangement of the associated rings 27, 28 and 29, a running joint with closely adjacent surfaces is provided between the impeller chamber and the suction chamber, which joint presents spaced lateral zig-zag passages $a$ connected at their outer ends by an extended cross-passage $b$ (Fig. 2) through all of which the leakage from the impeller chamber is constrained to flow in an extended devious and reverse course before it issues therefrom (at $c$) into the suction chamber at the mouth of the adjacent inlet eye of the hub, and hence the amount of leakage is reduced to a minimum and at the same time the velocity of the escaping liquid is materially reduced, as previously mentioned. In addition the minimum surface (at $d$) of the rotating packing ring is subjected to the pressure in the impeller chamber, thus minimizing the friction between the associated sealing members.

I claim—

1. Sealing means of the character described, comprising a rotatable ring of general H-form in cross-section having two outer and one inner peripheral bearing surface on each side, and a stationary ring on each side of the H-ring and being in bearing relation with said surface to afford a joint having two spaced lateral zig-zag passages connected at one end by an extended cross-passage, one of said rings being of general E-form in cross-section and the other being of general U-form in cross-section.

2. Sealing means for a pump having impeller and suction chambers, and an impeller hub having an inlet eye for delivering fluid from the suction chamber to the impeller chamber, said sealing means comprising a ring of general H-form in cross-section fast on the hub having two outer and two inner peripheral bearing portions on the suction chamber side and two outer and one inner peripheral bearing portions on the impeller chamber side, and a stationary ring on each side of the H-ring and being in bearing relation with said bearing portions, the ring at the suction chamber side being of general E-form in cross-section and the ring at the impeller chamber side being of general U-form in cross-section.

Signed at New York, in the county and State of New York, this 3rd day of October, A. D. 1930.

RHEUEL H. FREDERICK.